United States Patent
Bakatsias et al.

(10) Patent No.: US 10,429,604 B2
(45) Date of Patent: Oct. 1, 2019

(54) MODULAR FIBER OPTIC CABLE SPLITTER

(71) Applicant: RAYCAP S.A., Athens (GR)

(72) Inventors: Konstantinos Bakatsias, Athens (GR); Elias Gonalakis, Athens (GR); Charis Coletti, Athens (GR); Eleni Dimou, Athens (GR)

(73) Assignee: RAYCAP S.A., Athens (GR)

( * ) Notice: Subject to any disclaimer, the term of this patent is extended or adjusted under 35 U.S.C. 154(b) by 61 days.

(21) Appl. No.: 15/952,175

(22) Filed: Apr. 12, 2018

(65) Prior Publication Data

US 2018/0231731 A1  Aug. 16, 2018

Related U.S. Application Data

(62) Division of application No. 14/931,699, filed on Nov. 3, 2015, now Pat. No. 9,971,119.

(51) Int. Cl.
*G02B 6/36* (2006.01)
*G02B 6/44* (2006.01)
(Continued)

(52) U.S. Cl.
CPC ......... *G02B 6/4472* (2013.01); *G02B 6/4452* (2013.01); *G02B 6/4455* (2013.01);
(Continued)

(58) Field of Classification Search
USPC ....................................................... 385/135
See application file for complete search history.

(56) References Cited

U.S. PATENT DOCUMENTS 3,165,372 A   1/1965   Jacobs
3,659,189 A   4/1972   Kiviranna
(Continued)

FOREIGN PATENT DOCUMENTS

CH          698717 B1    10/2009
DE    20 2005 021740 U1   8/2009
(Continued)

OTHER PUBLICATIONS

"Relay" from Wikipedia. Downloaded Oct. 30, 2009.
(Continued)

*Primary Examiner* — Eric Wong
(74) *Attorney, Agent, or Firm* — Schwabe Williamson & Wyatt, PC (57) ABSTRACT

An optical interface includes a rack mountable enclosure that includes multiple slots for retaining multiple insertable fiber optic (FO) modules. The FO modules include a first set of interconnection ports that connect to remote radio units (RRUs), a second set of interconnection ports that connect to a baseband unit (BBU), and a third set of monitoring ports that connect to monitoring/text equipment. The FO modules contain fiber splitters that split off uplink/receive and downlink/transmit signals carried on optical fibers to the third set of monitoring ports. The FO modules may insert in different orientations and directions into different rack mountable enclosure configurations for higher density and more configurable connectivity. A splitter holder is located within the FO module and provides improved optical fiber routing for more integrated module port interconnectivity.

20 Claims, 9 Drawing Sheets

(51) Int. Cl.
  *H04B 10/079* (2013.01)
  *H04W 88/08* (2009.01)
  *H04B 10/80* (2013.01)
  *H04B 10/077* (2013.01)

(52) U.S. Cl.
  CPC ..... *H04B 10/077* (2013.01); *H04B 10/07953* (2013.01); *H04B 10/801* (2013.01); *H04W 88/085* (2013.01)

(56) References Cited

U.S. PATENT DOCUMENTS

| | | |
|---|---|---|
| 3,976,351 A | 8/1976 | Hopfe |
| 4,030,061 A | 6/1977 | Gaskell |
| 4,236,190 A | 11/1980 | Hollingsead |
| 4,918,565 A | 4/1990 | King |
| 4,976,508 A | 12/1990 | Okura |
| 5,030,128 A | 7/1991 | Herron |
| 5,311,397 A | 5/1994 | Harshberger |
| D361,314 S | 8/1995 | Ryan |
| D362,232 S | 9/1995 | Ryan |
| 5,473,718 A | 12/1995 | Sommer |
| 5,491,766 A | 2/1996 | Huynh |
| 5,530,215 A | 6/1996 | Couvreur |
| 5,555,153 A | 9/1996 | Frederiksen |
| 5,602,532 A | 2/1997 | Ryan |
| 5,627,721 A | 5/1997 | Figueiredo |
| 5,651,698 A | 7/1997 | Locati |
| 5,701,227 A | 12/1997 | Ryan |
| 5,717,685 A | 2/1998 | Abraham |
| 5,790,360 A | 8/1998 | Ryan |
| 5,805,757 A | 9/1998 | Bloom |
| 5,903,693 A | 5/1999 | Brown |
| 5,914,845 A | 6/1999 | Chase |
| 5,953,193 A | 9/1999 | Ryan |
| 5,966,282 A | 10/1999 | Ryan |
| 5,969,932 A | 10/1999 | Ryan |
| 6,031,706 A | 2/2000 | Nabell |
| 6,037,544 A | 3/2000 | Lee |
| 6,038,119 A | 3/2000 | Atkins |
| 6,074,247 A | 6/2000 | Hall |
| 6,114,632 A | 9/2000 | Planas, Sr. |
| 6,122,156 A | 9/2000 | Nabell |
| 6,125,048 A | 9/2000 | Loughran |
| 6,389,214 B1 | 5/2002 | Smith |
| 6,418,262 B1 | 7/2002 | Puetz |
| 6,430,020 B1 | 8/2002 | Atkins |
| 6,535,369 B1 | 3/2003 | Redding |
| 6,556,402 B2 | 4/2003 | Kizis |
| 6,623,315 B1 | 9/2003 | Roderick |
| 6,640,111 B1 | 10/2003 | Shapira |
| 6,654,223 B1 | 11/2003 | Bippus |
| 6,715,619 B2 | 4/2004 | Kim |
| 6,719,615 B1 | 4/2004 | Molnar |
| 6,729,902 B2 | 5/2004 | Martich |
| 6,738,555 B1 | 5/2004 | Cooke |
| 6,748,155 B2 | 6/2004 | Kim |
| 6,763,171 B2 | 7/2004 | D'Inca |
| 6,771,861 B2 | 8/2004 | Wagner |
| 6,792,190 B2 | 9/2004 | Xin |
| 6,804,447 B2 | 10/2004 | Smith |
| 6,809,258 B1 | 10/2004 | Dang |
| 6,813,510 B1 | 11/2004 | Kunzinger |
| 6,851,966 B1 | 2/2005 | Tomasino |
| 6,876,533 B1 | 4/2005 | Ryan |
| 6,937,807 B2 | 8/2005 | Franklin |
| 7,008,256 B2 | 3/2006 | Poiraud |
| 7,035,073 B2 | 4/2006 | Bennett |
| 7,228,047 B1 | 6/2007 | Szilagyi |
| 7,218,828 B2 | 8/2007 | Feustel |
| 7,302,149 B2 | 11/2007 | Swam |
| 7,327,926 B2 | 2/2008 | Barth |
| 7,376,322 B2 * | 5/2008 | Zimmel ............... G02B 6/4442 385/135 |
| 7,397,673 B1 | 7/2008 | Wilson |
| 7,433,169 B2 | 10/2008 | Kamel |
| 7,460,381 B2 | 12/2008 | Lanni |
| 7,508,687 B2 | 3/2009 | Manolescu |
| 7,526,174 B2 | 4/2009 | Leon |
| 7,664,363 B1 | 2/2010 | Mowery, Sr. |
| 7,739,522 B2 | 6/2010 | Festo |
| 7,768,794 B1 | 8/2010 | Wilson |
| RE41,655 E | 9/2010 | Woodhead |
| 7,894,782 B2 | 2/2011 | Rofougaran |
| 7,946,863 B2 | 5/2011 | Loch |
| 7,949,315 B2 | 5/2011 | Rofougaran |
| 7,972,067 B2 | 7/2011 | Haley |
| 8,021,189 B2 | 9/2011 | Zayas |
| 8,111,966 B2 | 2/2012 | Holmberg |
| 8,180,192 B2 | 5/2012 | Zimmel |
| 8,279,067 B2 | 10/2012 | Berger |
| 8,383,521 B2 | 2/2013 | Nishimura et al. |
| 8,401,497 B2 | 3/2013 | Rofougaran |
| 8,401,501 B2 | 3/2013 | Rofougaran |
| 8,412,385 B2 | 4/2013 | Brumett, Jr. |
| 8,457,461 B2 | 6/2013 | Ott |
| 8,467,655 B2 | 6/2013 | German |
| 8,490,799 B2 | 7/2013 | Knight |
| 8,521,100 B2 | 8/2013 | Rofougaran |
| 8,620,549 B2 | 8/2013 | Rofougaran |
| 8,526,200 B2 | 9/2013 | Miller |
| 8,526,893 B2 | 9/2013 | Rofougaran |
| 8,547,164 B2 | 10/2013 | Flores |
| 8,566,627 B2 | 10/2013 | Halepete |
| 8,577,359 B2 | 11/2013 | Wesby |
| 8,588,606 B2 | 11/2013 | Watte |
| 8,600,318 B2 | 12/2013 | Rofougaran |
| 8,730,639 B1 | 5/2014 | Wilson |
| 8,754,622 B2 | 6/2014 | Dobkin |
| 8,780,519 B2 | 7/2014 | Miller |
| 8,810,990 B1 | 8/2014 | Miller |
| 8,831,395 B2 | 9/2014 | Sievers |
| 8,839,594 B2 | 9/2014 | Smith |
| 8,873,926 B2 | 10/2014 | Beamon |
| 8,938,143 B2 | 1/2015 | Do |
| 8,989,548 B2 | 3/2015 | Kopf |
| 8,995,106 B2 | 3/2015 | Miller |
| 9,049,500 B2 | 6/2015 | Conner |
| 9,057,862 B2 | 6/2015 | Strasser |
| 9,099,860 B2 | 8/2015 | Martinez |
| 9,140,872 B2 | 9/2015 | Sedor |
| 9,179,500 B2 | 11/2015 | Yu |
| 9,281,866 B2 | 3/2016 | Smentek |
| 9,448,576 B2 | 9/2016 | Chamberlain |
| 9,575,277 B2 | 2/2017 | Bakatsias |
| 9,640,986 B2 | 5/2017 | Politis |
| 9,673,904 B2 | 6/2017 | Palanisamy |
| 2001/0053971 A1 | 12/2001 | Demetrescu |
| 2002/0055306 A1 | 5/2002 | Jenks |
| 2002/0196593 A1 | 12/2002 | Kizis |
| 2003/0027521 A1 | 2/2003 | Yip |
| 2003/0085621 A1 | 5/2003 | Potega |
| 2003/0113086 A1 | 6/2003 | Jun |
| 2003/0148668 A1 | 8/2003 | Lias |
| 2004/0119386 A1 | 6/2004 | Guidez |
| 2004/0198451 A1 | 10/2004 | Varghese |
| 2004/0246693 A1 | 12/2004 | Lloyd |
| 2005/0036262 A1 | 2/2005 | Siebenthall |
| 2005/0042920 A1 | 2/2005 | Poiraud |
| 2005/0094359 A1 | 5/2005 | Lee |
| 2005/0157461 A1 | 7/2005 | Cauthron |
| 2006/0139836 A1 | 6/2006 | Anthony |
| 2006/0153362 A1 | 7/2006 | Bloodworth |
| 2007/0024372 A1 | 2/2007 | Hagen |
| 2007/0093204 A1 | 4/2007 | Kincade |
| 2007/0163801 A1 | 7/2007 | Coffey |
| 2007/0217101 A1 | 9/2007 | Carter |
| 2008/0037188 A1 | 2/2008 | Wilson |
| 2008/0106881 A1 | 5/2008 | Tari |
| 2008/0117555 A1 | 5/2008 | Wilson |
| 2008/0139045 A1 | 6/2008 | Ho |
| 2008/0186667 A1 | 8/2008 | Verdelli |
| 2008/0272654 A1 | 11/2008 | Lontka |
| 2008/0278889 A1 | 11/2008 | Briggs |

(56) References Cited

U.S. PATENT DOCUMENTS

| | | |
|---|---|---|
| 2008/0298762 A1 | 12/2008 | Hawley |
| 2008/0310060 A1 | 12/2008 | Metral |
| 2009/0103218 A1 | 4/2009 | Ryan |
| 2009/0103881 A1 | 4/2009 | Gonzalez |
| 2009/0226143 A1 | 9/2009 | Beck |
| 2009/0238531 A1 | 9/2009 | Holmberg |
| 2009/0257727 A1 | 10/2009 | Laurisch |
| 2010/0034507 A1 | 2/2010 | Sielaff |
| 2010/0054676 A1 | 3/2010 | Cooke |
| 2010/0181840 A1 | 7/2010 | Coulson |
| 2010/0259871 A1 | 10/2010 | Ewing |
| 2011/0101937 A1 | 5/2011 | Dobkin |
| 2011/0135316 A1 | 6/2011 | Fankhauser |
| 2011/0237299 A1 | 9/2011 | Boss |
| 2012/0051710 A1 | 3/2012 | Zeng |
| 2012/0069882 A1 | 3/2012 | Nino |
| 2012/0092835 A1 | 4/2012 | Miller |
| 2012/0114295 A1 | 5/2012 | Guzzo |
| 2012/0200978 A1 | 8/2012 | Miller |
| 2012/0200979 A1 | 8/2012 | Miller |
| 2012/0230636 A1 | 9/2012 | Blockley |
| 2012/0269509 A1 | 10/2012 | Hultermans |
| 2012/0317426 A1 | 12/2012 | Hunter, Jr. |
| 2012/0319485 A1 | 12/2012 | Ewing |
| 2013/0003677 A1 | 1/2013 | Yu |
| 2013/0039629 A1 | 2/2013 | Krampotich |
| 2013/0051440 A1 | 2/2013 | Rofougaran |
| 2013/0084050 A1 | 4/2013 | Vastmans |
| 2013/0114930 A1 | 5/2013 | Smith |
| 2013/0146355 A1 | 6/2013 | Strasser |
| 2013/0170801 A1 | 7/2013 | Do |
| 2013/0215804 A1 | 8/2013 | Lu |
| 2013/0294735 A1 | 11/2013 | Burris |
| 2013/0308915 A1 | 11/2013 | Buff |
| 2013/0340361 A1 | 12/2013 | Rogers |
| 2014/0168842 A1 | 6/2014 | Martinez |
| 2014/0219622 A1 | 8/2014 | Coan |
| 2014/0376909 A1 | 12/2014 | Frisken |
| 2015/0006095 A1 | 1/2015 | Voisine |
| 2015/0109710 A1 | 4/2015 | Politis |
| 2015/0155669 A1 | 6/2015 | Chamberlain |
| 2015/0155706 A1 | 6/2015 | Miller |
| 2015/0168974 A1 | 6/2015 | Mascarenhas |
| 2015/0234405 A1 | 8/2015 | Chamberlain |
| 2015/0334476 A1 | 11/2015 | Smith |
| 2016/0043806 A1 | 2/2016 | Maricevic |
| 2016/0342168 A1 | 11/2016 | Chamberlain et al. |
| 2017/0123175 A1* | 5/2017 | Van Baelen ......... G02B 6/3897 |
| 2018/0157000 A1 | 6/2018 | Miller |
| 2018/0159319 A1 | 6/2018 | Miller |
| 2018/0213091 A1 | 7/2018 | Kostakis |

FOREIGN PATENT DOCUMENTS

| | | |
|---|---|---|
| EP | 0 095 539 A1 | 12/1983 |
| EP | 0 942 303 A1 | 9/1999 |
| EP | 1 855 365 A1 | 11/2007 |
| EP | 2005854158 | 11/2007 |
| EP | 2 469 661 A1 | 6/2012 |
| GB | 2421641 A | 6/2006 |
| JP | 2005 317472 A | 11/2005 |
| KR | 10-2010-0048227 A | 5/2010 |
| KR | 10-2010-0069332 A | 6/2010 |
| WO | 2006/076120 A1 | 7/2006 |
| WO | 2008/059212 A1 | 5/2008 |
| WO | 2010/024847 A2 | 3/2010 |
| WO | 2012/038104 A1 | 3/2012 |
| WO | 2012/108929 A1 | 8/2012 |
| WO | 2012/108930 A1 | 8/2012 |
| WO | 2013/055591 A2 | 4/2013 |
| WO | 2013/165657 A1 | 11/2013 |
| WO | 2014/009255 A1 | 1/2014 |
| WO | 2014/118227 A1 | 8/2014 |
| WO | 2014/134154 A1 | 9/2014 |

OTHER PUBLICATIONS

CPRI Link Mobile Field Testing; AES (Advanced Embedded Solutions), aes-eu.com; Jun. 14, 2014; retrieved from the Internet Jun. 8, 2017 at <http://aes-eu.com/mobile-field-testing.php>; 4 pages.

FIS, the Solutionists, "High Density C-ran CPRI Interface Panel" Product Catalog, Rev. A; May 2015; Oriskany, New York; 2 pages.

FIS, the Solutionists, CPRI Interface Panel Drawer with Integrated Cable Management; Sep. 27, 2015; ubeity.squarespace.com; Rev. A 3-2; 2 pages.

Müller, Ulrich, Deploying and Managing New Cell Sites with FRR; Apr. 4, 2015; Telcom Infra Event; <http://telecominfraonline.nl/deploying-managing-new-cell-sites/>; 21 pages.

Williams, et al. "2-Wire Virtual Remote Sensing for Voltage Regulators—Clairvoyance Marries Remote Sensing" Linear Technology Brochure, Application Note 126, Oct. 2010; www.linear.com; pp. AN126-1-AN126-22.

International Preliminary Report on Patentablity and Written Opinion of the International Searching Authority for PCT/US2011/064704; dated Aug. 22, 2013; 8 pages.

International Preliminary Report on Patentablity and Written Opinion of the International Searching Authority for PCT/US2011/064717 dated Aug. 22, 2013; 8 pages.

International Search Report and Written Opinion for PCT/US2011/064704; dated May 16, 2012; 12 pages.

International Search Report and Written Opinion for PCT/US2011/064717 dated May 16, 2012; 13 pages.

International Search Report and Written Opinion for PCT/US2015/013740 dated Apr. 28, 2015; 17 pages.

International Search Report and Written Opinion for PCT/US2016/022575 dated Aug. 17, 2016; 14 pages.

International Search Report and Written Opinion for PCT/US2018/014553 dated Apr. 6, 2018; 11 pages.

* cited by examiner

MODULAR FIBER OPTIC CABLE SPLITTER

CROSS-REFERENCE TO RELATED APPLICATIONS

This application is a divisional of U.S. application Ser. No. 14/931,699, filed Nov. 3, 2015, the entire disclosure of which is incorporated herein by reference.

BACKGROUND

Until recently, most wireless communications sites included radio systems located on the ground level in a building, cabinet or other shelter. The direct current (DC) power supply, baseband controller, amplifiers and radios were historically located in one location within the shelter. From this location, coaxial cable was run from the radios to antennas that were supported on a tower outside the building.

Latest generation wireless communications systems, referred to as distributed antenna systems (DAS), distributed DC radio systems, remote radio heads (RRH), 4G and long term evolution (LTE) cellular communication systems, now commonly locate the radios next to the antennas on the tower outside of the communications shelter.

In these next-generation facilities, the baseband system module that controls radio traffic is still located at the ground level shelter, but the radios are separated from the controllers up to several hundred feet and controlled by fiber optic links. The radios are powered directly by DC feeds from the DC power plant that extend up the tower and to the radios. In some cases, the DC cables and fiber optic cables are run separately up the tower and in other cases they are all bundled together in one large hybrid cable.

Optical fiber signal testing often increases connection complexity and the load of installed equipment, such as passive components and fiber patchcords. Optical fiber testing also may increase connectivity failures as correct polarity becomes difficult to control and challenges infrastructure management in the already densely populated communication sites. As a result, telecommunication vendors often avoid implementing monitoring solutions downgrading the quality of the network physical layer infrastructure.

DETAILED DESCRIPTION

Several preferred examples are described with reference to the accompanying drawings. Various other examples are also possible and practical. The suppression system may be exemplified in many different forms and should not be construed as being limited to the examples set forth.

An optical interface includes a rack mountable enclosure that includes multiple slots for retaining multiple insertable fiber optic (FO) modules. The FO modules include a first set of interconnection ports that connect to remote radio units (RRUs), a second set of interconnection ports that connect to a baseband unit (BBU), and a third set of monitoring ports that connect to monitoring/text equipment. The FO modules contain fiber splitters that split off uplink/receive and downlink/transmit signals carried on optical fibers to the third set of monitoring ports. The FO modules may insert in different orientations and directions into different rack mountable enclosure configurations for higher density and more configurable connectivity. A splitter holder is located within the FO module and provides improved optical fiber routing for more integrated module port interconnectivity.

Figure 1:
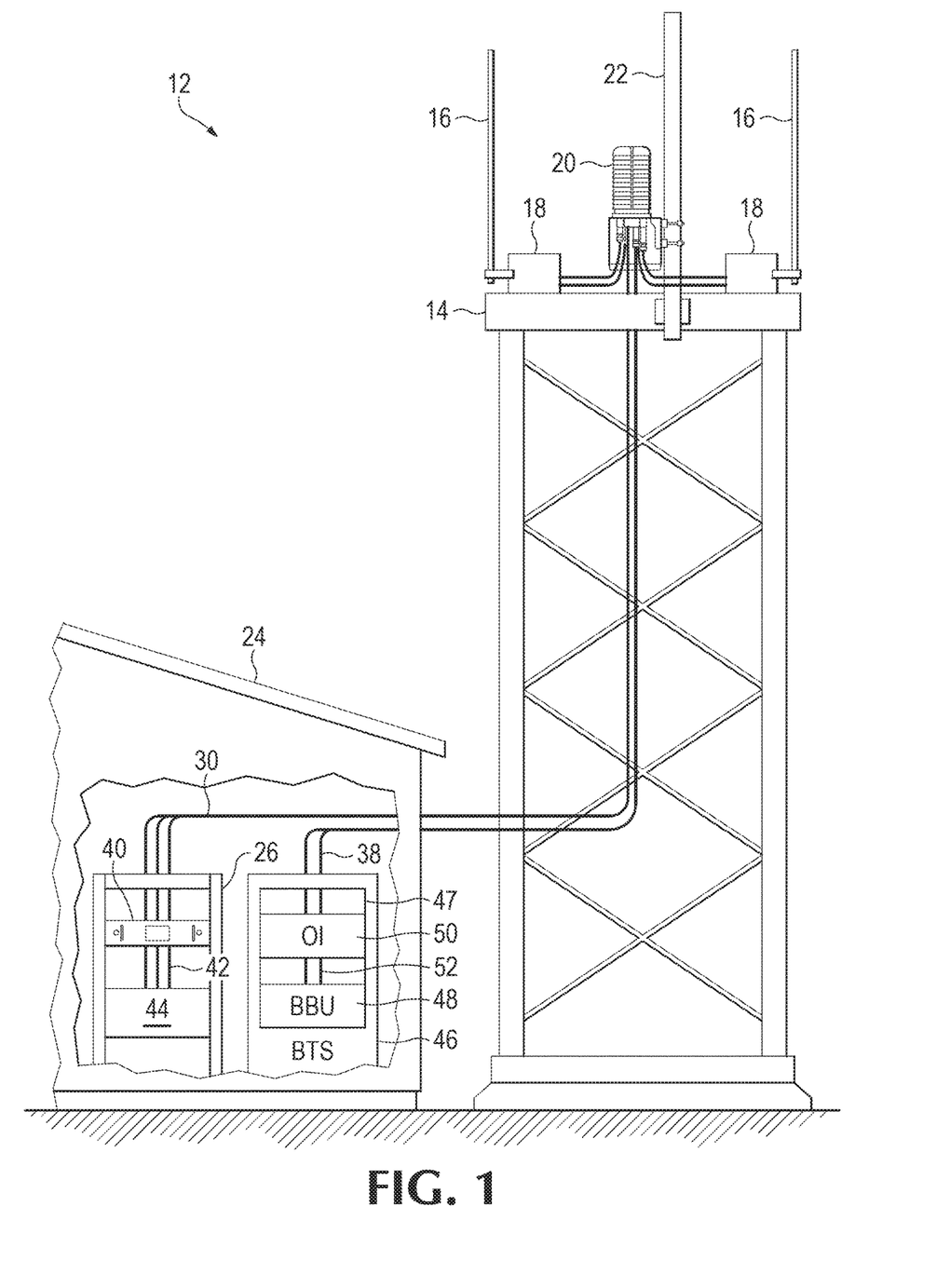
FIG. 1 shows a communication system that uses a modular optical interface.

FIG. 1 illustrates one example distributed wireless communication system 12. A building 24 contains computing equipment for a base transceiver communication station (BTS) 46. BTS 46 may be contained in a rack 47. A fiber to the antenna (FTTA) architecture connects communication station 46 through coaxial fiber optic (FO) cables 38 to different remote radio units (RRUs) 18 located on the top of a tower 14.

The FTTA architecture reduces signal loss over FO cables 38 by moving radio frequency (RF) circuits from BTS 46 to RRUs 18 and closer to radio transceiver antennas 16. The RRUs 18 communicate with a baseband unit (BBU) 48 in BTS 46 through bidirectional (Tx/Rx) low loss optical fiber links in FO cables 38 using a transmission protocol such as common public radio interface, open base station architecture initiative.

In order to protect active equipment ports and enhance system flexibility (reconfiguration & maintenance), FO cables 38 are not directly terminated on BBU 48 but terminated on an intermediate optical interface (OI) subrack 50 contained on rack 47. Common fiber patchcords 52 then connect optical interface 50 to baseband unit 48.

In other examples, radios 18 may be located on the top of a building that also houses DC power plant 44 and communication station 46. In another configuration, radios 18 and associated antennas 16 are located at different corners on the roof of a building.

A direct current (DC) power plant 44 is connected through a DC power bus 42 and DC power cables 30 to the different radios 18 on tower 14. A remote suppression unit 20 may be attached to a support 22 on top of tower 14 and connected to the remote ends of power cables 30 proximate to radios 18 and antennas 16.

A local rack based suppression unit 40 is located inside of building 24 and connected to the opposite local ends of power cables 30 relatively close to DC power plant 44 and communication station 46. In one embodiment, suppression unit 40 is located in a rack 26 that also contains DC power plant 44. In another example, suppression unit 40 is located in another rack or some other location next to power plant 44.

Other suppression and optical fiber units are described in the following patents which are all incorporated by reference in their entireties:

Patent application Ser. No. 12/984,304 filed Jan. 4, 2011, entitled: OVERVOLTAGE PROTECTION SYSTEM FOR RADIO HEAD-BASED WIRELESS COMMUNICATION SYSTEMS;

Patent application Ser. No. 13/005,275 filed Jan. 12, 2011; entitled: OVERVOLTAGE PROTECTION FOR REMOTE RADIO HEAD-BASED WIRELESS COMMUNICATIONS SYSTEMS; and Patent application Ser. No. 13/301,685 filed Nov. 21, 2011; entitled; MODULAR AND WEATHER RESISTANT OVERVOLTAGE PROTECTION SYSTEM FOR WIRELESS COMMUNICATION SYSTEMS.

Figure 2:
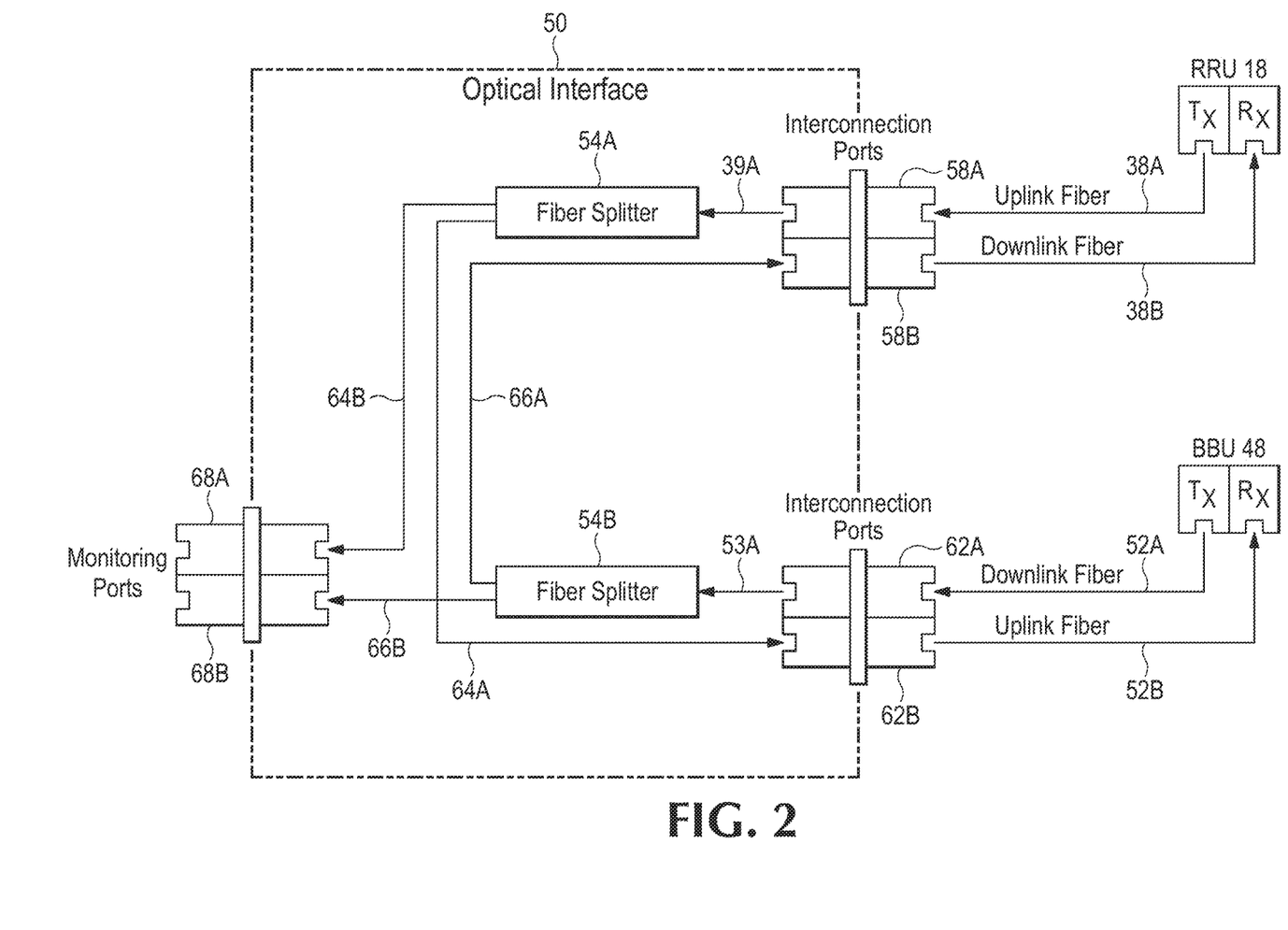
FIG. 2 shows a circuit diagram for the modular optical interface.

FIG. 2 depicts an example connection diagram for optical interface 50 shown in FIG. 1. Optical interface 50 provides a more effective system for performing network maintenance and troubleshooting operations, such as fiber physical integrity investigation, attenuation spatial resolution, etc. Optical interface 50 avoids the transmission interruptions and unwanted downtime typically associated with testing fiber links.

Coaxial fiber optic cables 38 in FIG. 1 may include multiple pairs of uplink optical fibers 38A and downlink fibers 38B each connected to a different RRU 18. Fiber patchcords 52 in FIG. 1 also may include multiple pairs of uplink fibers 52B and downlink fibers 52A connecting to BBU 48.

A first set of interconnection ports 58 connect uplink optical fiber 38A to fiber splitter 54A via fiber 39A and connect downlink optical fiber 38B to fiber splitter 54B via fiber 66A. A second set of interconnection ports 62 connect downlink fiber 52A to fiber splitter 54B via fiber 53A and connect uplink optical fiber 52B to fiber splitter 54A via fiber 64A. A third set of monitoring ports 68 connect to fiber splitter 54A via fiber 64B and connect to fiber splitter 54B via fiber 66B.

Fiber splitters 54 enable network maintenance without breaking active links between RRUs 18 and BBU 48 thus eliminating downtime. For example, fiber splitter 54A includes passive optical components that split optical signals on uplink fiber 38A into separate duplicate optical signals on optical fibers 64A and 64B.

Uplink signals on optical fibers 64A and 64B are duplicate portions of the same common optical uplink signal received on uplink fiber 38A. Uplink signals on fiber 64A may connect via port 62B and uplink fiber 52B to active communication equipment in BBU 48 while the same uplink signals on fiber 64B may connect via monitoring port 68A to monitoring/test equipment (not shown).

An operator may use the monitoring/test equipment connected to monitoring ports 68 to perform testing operations, such as power measurements, out of band optical time domain reflectometry, or radio frequency (RF) over common protocol radio interface measurements.

Since a separate uplink signal is connected via fiber 64B to monitoring port 68A, the test equipment may perform tests without interrupting signal transmissions between RRU 18 and BBU 48.

Power levels at each uplink signal 64A and 64B may depend on the specific specifications for optical fiber splitter 54A. A splitting ratio and number of output ports on fiber splitter 54A can vary from 1% to 99% of the input signal power on uplink fiber 38A. For example, fiber splitter 54A may split the power of uplink signals on fibers 64A and 64B each by 50% of the signal power on uplink fiber 38A.

Efficient signal monitoring may require control on both transmitting (Tx) and receiving (Rx) directions. Therefore, second fiber splitter 54B splits downlink signals transmitted from BBU 48 to RRU 18 on downlink fiber 52A into two downlink signals on fibers 66A and 66B. The split downlink signal on fiber 66A goes to RRU 18 via port 58B and fiber 38B. The split downlink signal on fiber 66B does to the monitoring/test equipment via monitoring port 68B. Fiber splitter 54B may divide output power levels similar to fiber splitter 54A. Fiber splitters 54 are known to those skilled in the art and are therefore not described in further detail.

Figure 3:
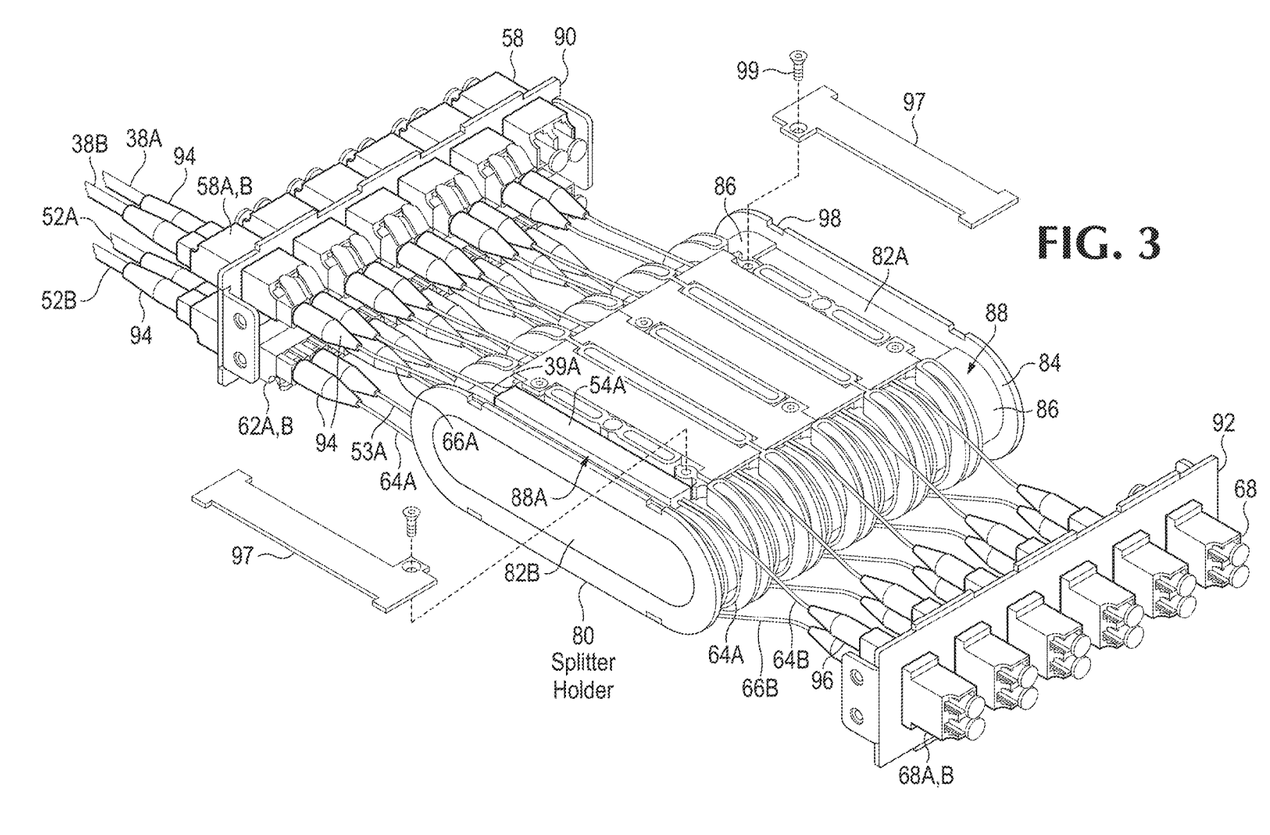
FIG. 3 shows a splitter holder used in the optical interface.

FIG. 3 shows a splitter holder 80 that contains multiple fiber splitters 54. Splitter holder 80 has an oval shape with substantially flat parallel upper and lower sections 82A and 82B, respectively, and round ends sections 86 extending between top and bottom sections 82A and 82B. Channel walls 84 extend radially out and around an outside surface of splitter holder 80 forming separate channels 88. A plate 90 retains the first and second set of interconnection ports 58 and 62, respectively, and a plate 92 retains the third set of monitoring ports 68.

The elongated oval shape of channels 88 provide compact routing of optical fibers to different ports. For example, a first optical uplink fiber 39A extends from interconnection port 58A, over flat top section 82A of splitter holder 80, and to a first end of upper fiber splitter 54A. Uplink fiber 64A extends from a second end of upper fiber splitter 54A, around round end section 86 and along bottom section 82B of splitter holder 80, and connects to one of the second set of interconnection uplink ports 62B. A third uplink fiber 64B extends from the second end of upper fiber splitter 54A, along top section 82A of the splitter holder 80, and connects to one of uplink monitoring ports 68A.

The same channel 88 retains a set of optical downlink fibers including fiber 53A extending from interconnection port 62A, along bottom section 82B of splitter holder 80, and to a first end of lower fiber splitter 54B (see FIG. 1) located underneath bottom section 82B. A second downlink fiber 66A extends from a second end of lower fiber splitter 54B, around round end section 86 and along top section 82A of splitter holder 80, and connects to interconnection port 58B. Optical downlink fiber 66B extends from the second end of lower fiber splitter 54B, underneath bottom section 82B of splitter holder 80 and connects to monitoring port 68B.

Uplink fibers 38A and 39A include snap connectors 94 that snap into and interconnect via interconnection ports 58A and downlink fibers 38B and 66A include snap connectors 94 that snap into and interconnect via interconnection port 58B. Uplink fibers 52B and 64A include snap connectors 94 that snap into and interconnect via interconnection port 62B and downlink fibers 52A and 53A include snap connectors 94 that snap into and interconnect via interconnection port 62A. Uplink fiber 64B and downlink fiber 66B include snap connectors 96 that snap into monitoring ports 68A and 68B, respectively.

After fibers are run through a channel 88, individual caps 97 are attached over top section 82A and bottom section 82B of splitter holder 80. Caps 97 insert into notches 98 formed in channel walls 84 of channel 88 and are held down with screws 99.

Splitter holder 80 routes fibers to ports 58, 62, and 68 in a space efficient manner enabling fast, clean installation, and high termination density. Channels 88 provide both physical and visual fiber separation for efficient fiber management and provides minimum bending radius requirements eliminating signal attenuation and signal loss introduced by improper routing. Reducing signal losses support state of the art wavelength divisional multiplexing (WDM) architectures.

Figure 4:
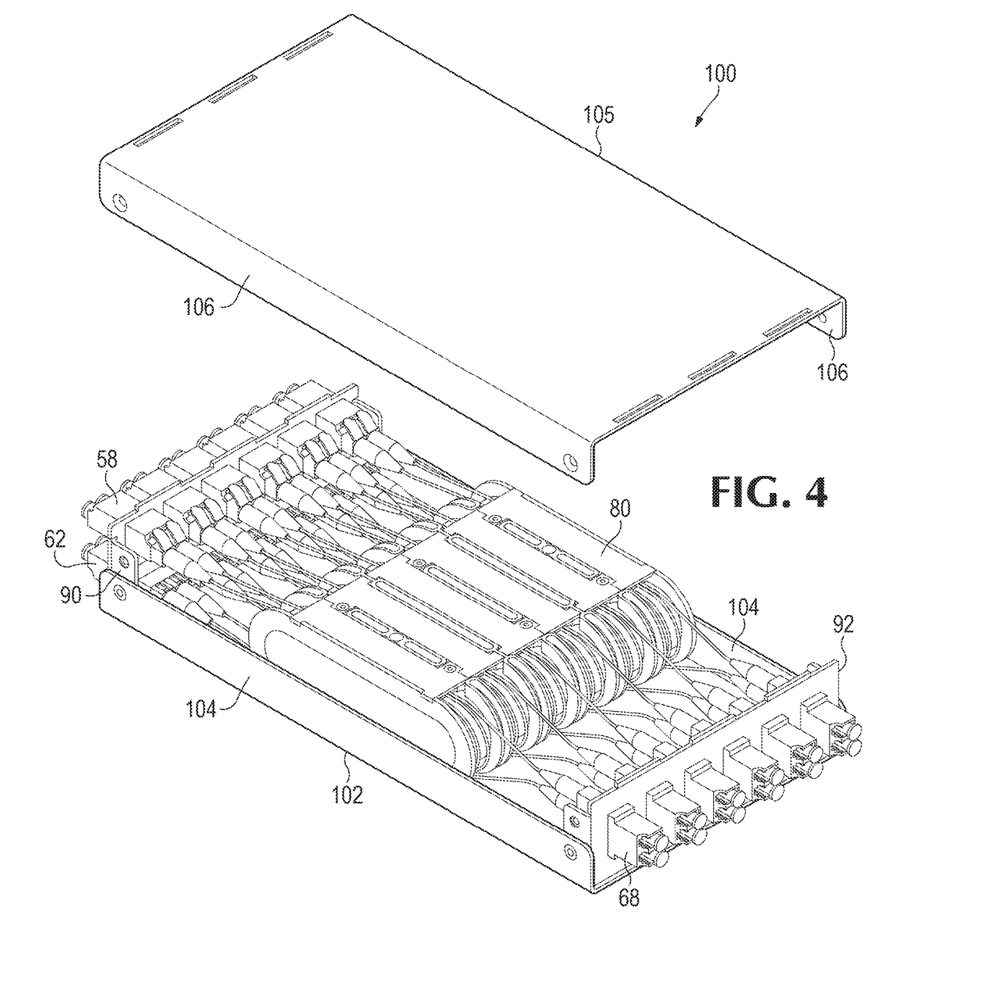
FIG. 4 shows a fiber optic module used in the optical interface.

FIG. 4 shows a fiber optic module 100 that retains splitter holder 80. Splitter holder 80 sits inside of a container that includes a base plate 102. Bottom ends of mounting plates 90 and 92 insert in between and attach via screws to side walls 104 that extend up along the sides of base plate 102.

A container cover 105 extends over splitter holder 80, baseplate 102, and mounting plates 90 and 92. Walls 106 extend down from sides of cover 104 and attach via screws to an upper end of mounting plates 90 and 92. Interconnection ports 58 and 62 extend in rows or columns out from a first end of module 100 and monitoring ports 68 extend in a row or column out from of a second end of module 100.

Figure 5:
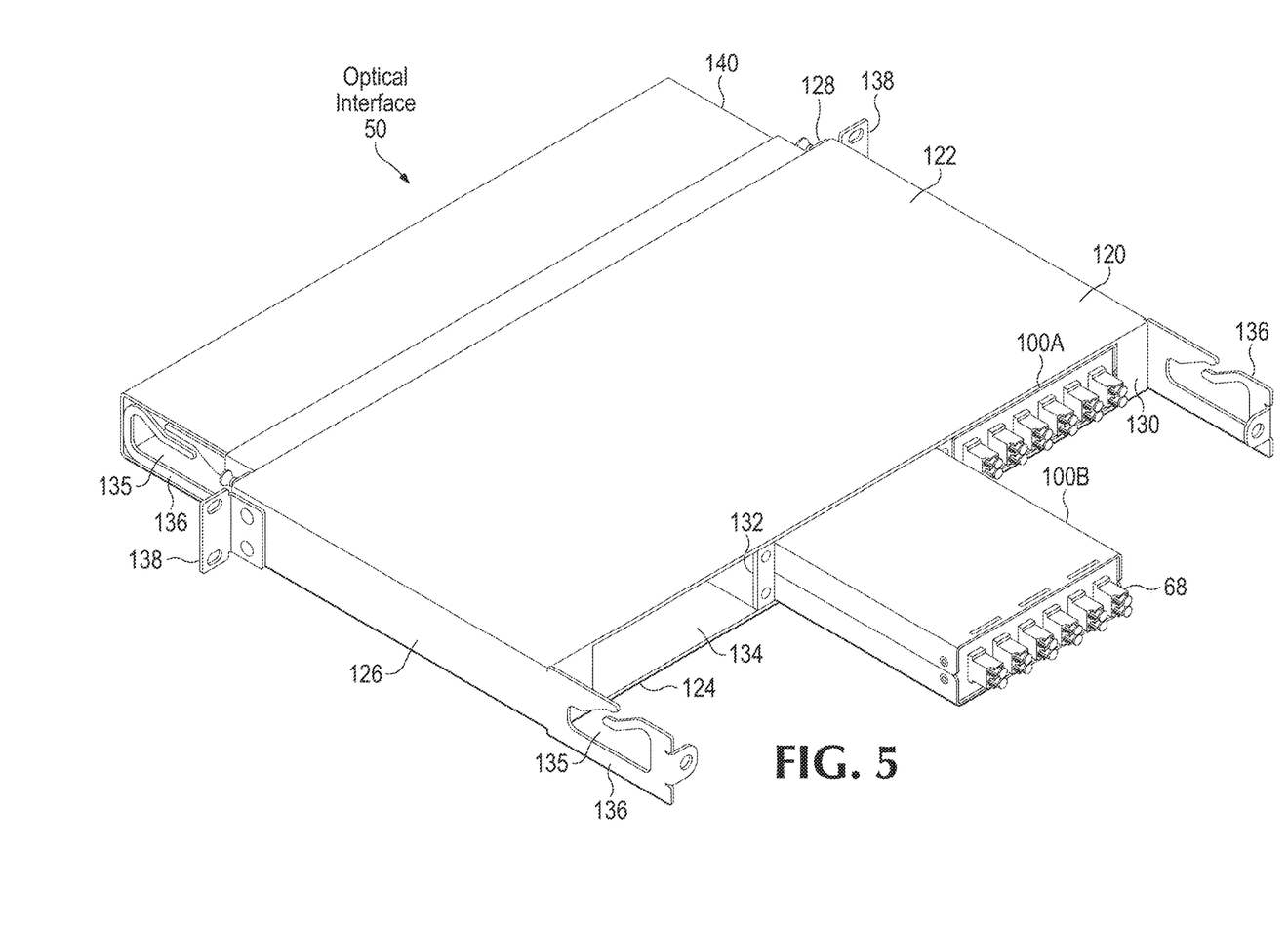
FIG. 5 shows fiber optic modules horizontally inserted into a rack enclosure.

FIG. 5 shows one example back view for an optical interface 50 that uses a rack enclosure 120 for retaining multiple FO modules 100. Enclosure 120 includes substantially flat parallel first and second walls 122 and 124, respectively, extending from a first end 128 to a second end 130. Side walls 126 extend between sides of first and second walls 122 and 124 from first end 128 to second end 130. Dividers 132 extend between first wall 122 and second wall 124 from first end 128 to second end 130 forming slots 134. Enclosure 120 may have a U1 dimensional profile that contains three slots 134.

Fiber optical modules 100 are configured to sliding insert horizontally along a lateral axis into slots 134. A first module 100A is shown fully inserted into one of slots 134 and a second module 100B is shown partially inserted into one of slots 134. Modules 100 are symmetric so that either end can be inserted into slot 134. In one example, a first end of module 100 retaining interconnection ports 58 and 62 is inserted into slot 134 and extends out end 128 of enclosure 120. In another example, a second end of module 100 retaining monitoring ports 68 is inserted into slot 134 and extends out end 128 of enclosure 120. The different insertion directions for modules 100 increase the types of port configurations configurable in enclosure 120.

Ears 138 may attach enclosure 120 to BTS rack 47 that also may retain BBU 48 (see FIG. 1). Retaining arms 136 extend from side walls 126 on ends 128 and 130 of enclosure 120. Retaining arms 136 support ends of optical fibers that connect to monitoring ports 68 and interconnection ports 58 and 62. The optical fibers may connect to the ports and then run laterally out through openings 135 formed in retaining arms 136. A cover 140 may extend over end 128, retaining arms 136, and the ends of optical fibers connected to the interconnection ports ports 58 and 62. Another similar cover 140 may extend over end 130, monitoring ports 68, and over the ends of optical fibers connected to monitoring ports 68. Covers 140 prevent technicians from accidentally bumping the optical fibers and disrupting signal transmissions.

Enclosure 120 receives up to three pluggable/replaceable modules 100 each containing a splitter holder 80 (FIG. 3). Each splitter holder 80 is configured to accommodate up to 12 fiber splitters 54 supporting six pairs of bidirectional uplink/downlink fibers for connecting to six RRUs. This compact solution enables channel monitoring via monitoring ports 68 without increasing the load of the installed components and without adding complexity since the network comes fully preconnectorized.

Figure 6:
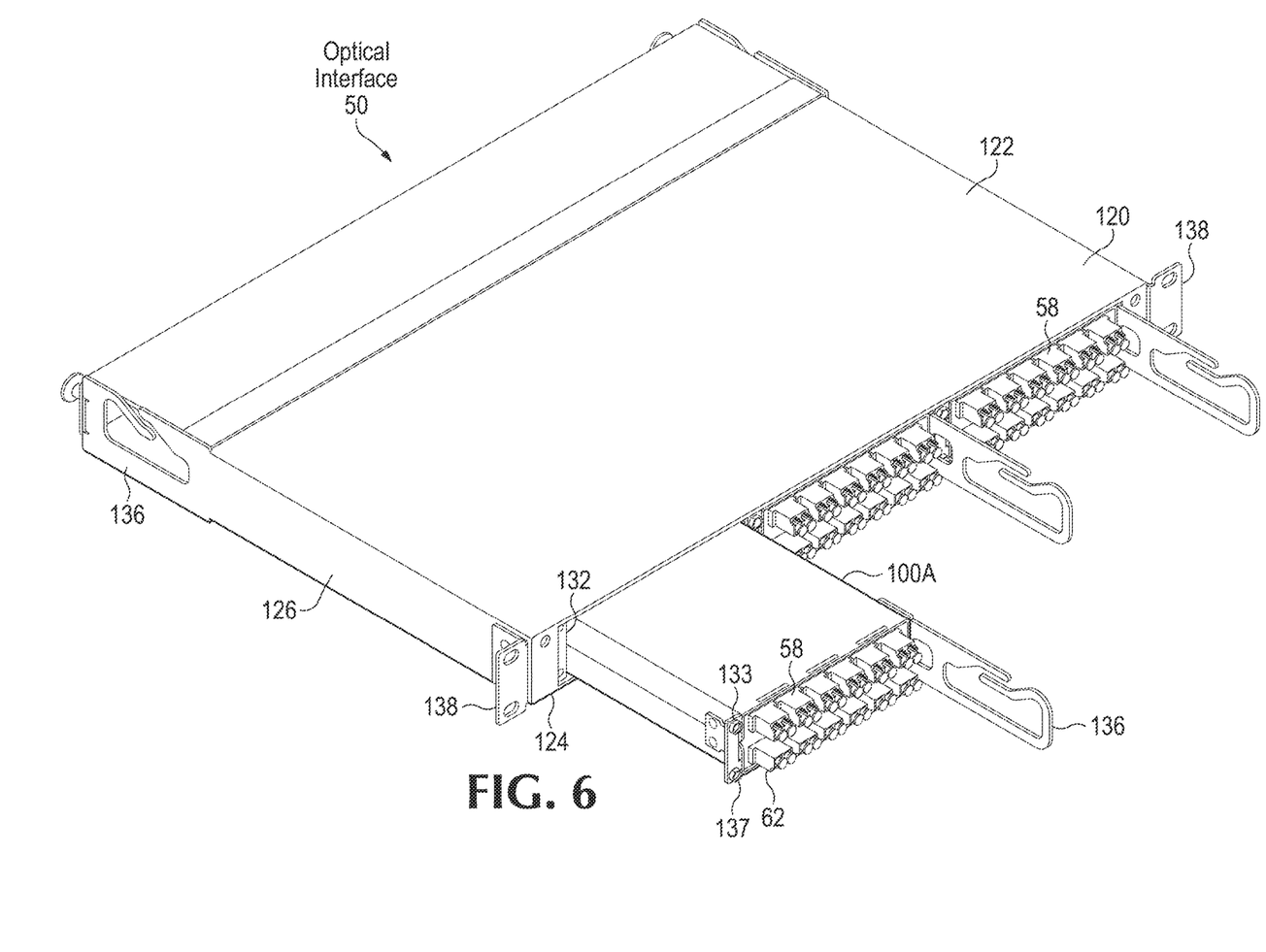
FIG. 6 shows an opposite view of the rack enclosure of FIG. 5.

FIG. 6 shows an opposite perspective front view of rack enclosure 120. In this example, modules 100 are configured to insert in from an opposite end of enclosure 120. Modules 100 may include angled brackets 133 that press up against a front face of dividers 132. Screws 137 insert through holes in brackets 133 and threadingly engage with holes formed in dividers 132. Retaining arms 136 attach to the sides of modules 100 opposite of brackets 133.

Figure 7:
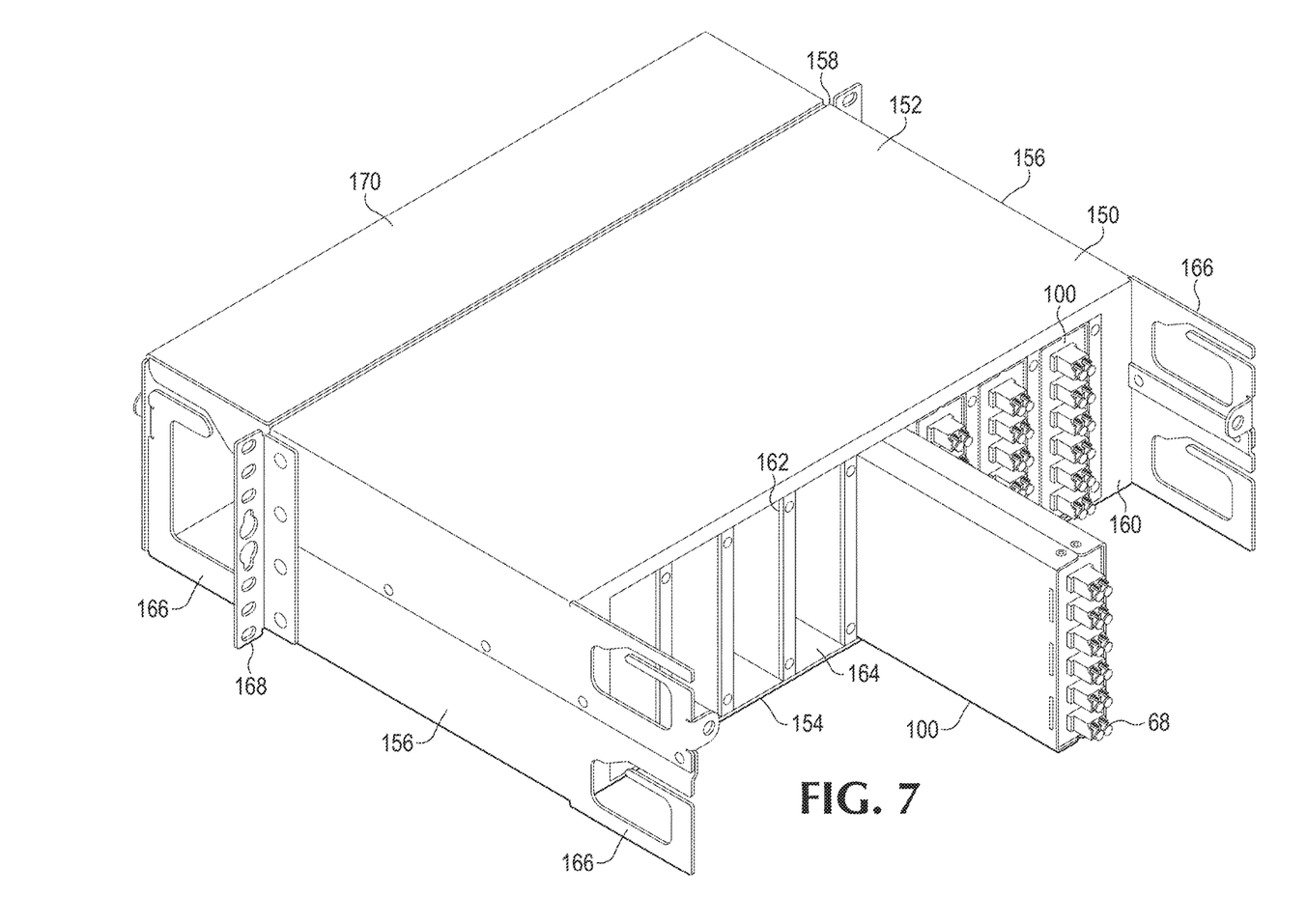
FIG. 7 shows fiber optic modules vertically inserted into a multi-column enclosure.

FIG. 7 shows a back view for another enclosure 150 with standard 3U 19 inch rack dimensions or 3U-23 inch rack dimensions. Enclosure 150 includes substantially flat parallel first and second walls 152 and 154, respectively, extending from a first end 158 to a second end 160. Side walls 156 extend between sides of first and second walls 152 and 154 from first end 158 to second end 160.

Dividers 162 extend between first wall 152 and second wall 154 from first end 158 to second end 160 forming slots 164. Modules 100 insert along a vertical elongated lateral axis into slots 164 and can also be inserted into slots 164 from either end. The 3U 19 inch rack enclosure 150 receives up to eight pluggable/replaceable modules 100 each containing a splitter holder 80 (FIG. 3). The 3U 23 inch rack enclosure receives up to ten pluggable/replaceable modules 100. Of course, other enclosure configurations can also be used.

Ears 168 may attach enclosure 150 to BTS rack 47 that also may retain BBU 48 (see FIG. 1). Retaining arms 166 extend from side walls 156 on first end 158 and second end 160. Retaining arms 166 support ends of optical fibers that connect to monitoring ports 68 that extend out from end 160. Other retaining arms 166 extending from end 158 support ends for a second set of fibers that connect to interconnection ports 58 and 62 (not shown). A cover 170 may extend over end 158, retaining arms 166, and the ends of the optical fibers connected to the interconnection ports 58 and 62.

Figure 8:
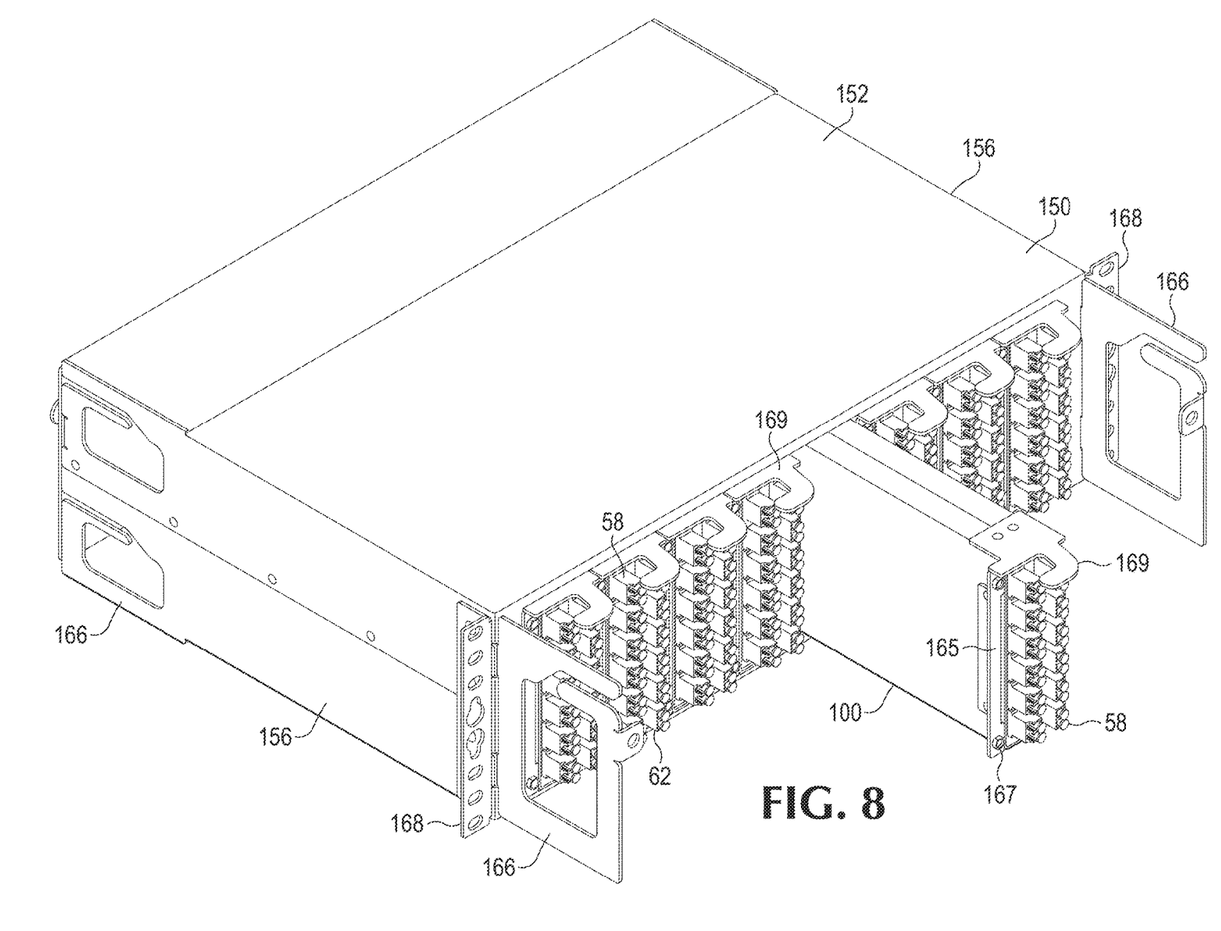
FIG. 8 shows an opposite view of the rack enclosure of FIG. 7.

FIG. 8 shows an opposite perspective front view of rack enclosure 150. In this example, modules 100 are configured to insert in from an opposite end of enclosure 150. Modules 100 may include angled brackets 165 that press up against a front face of dividers 162 (see FIG. 7). Screws 167 insert through holes in brackets 165 and threadingly engage with holes formed in dividers 162 (see FIG. 7). In this example, pull plates 169 are attached to top ends of FO modules 100. Pull plates 169 include L-shaped fingers that extend out from a front end of modules 100 that a technician uses to insert and remove FO modules 100 from rack 150 without disrupting the fiber lines connected to ports 58 and 62.

Figures 9, 10:
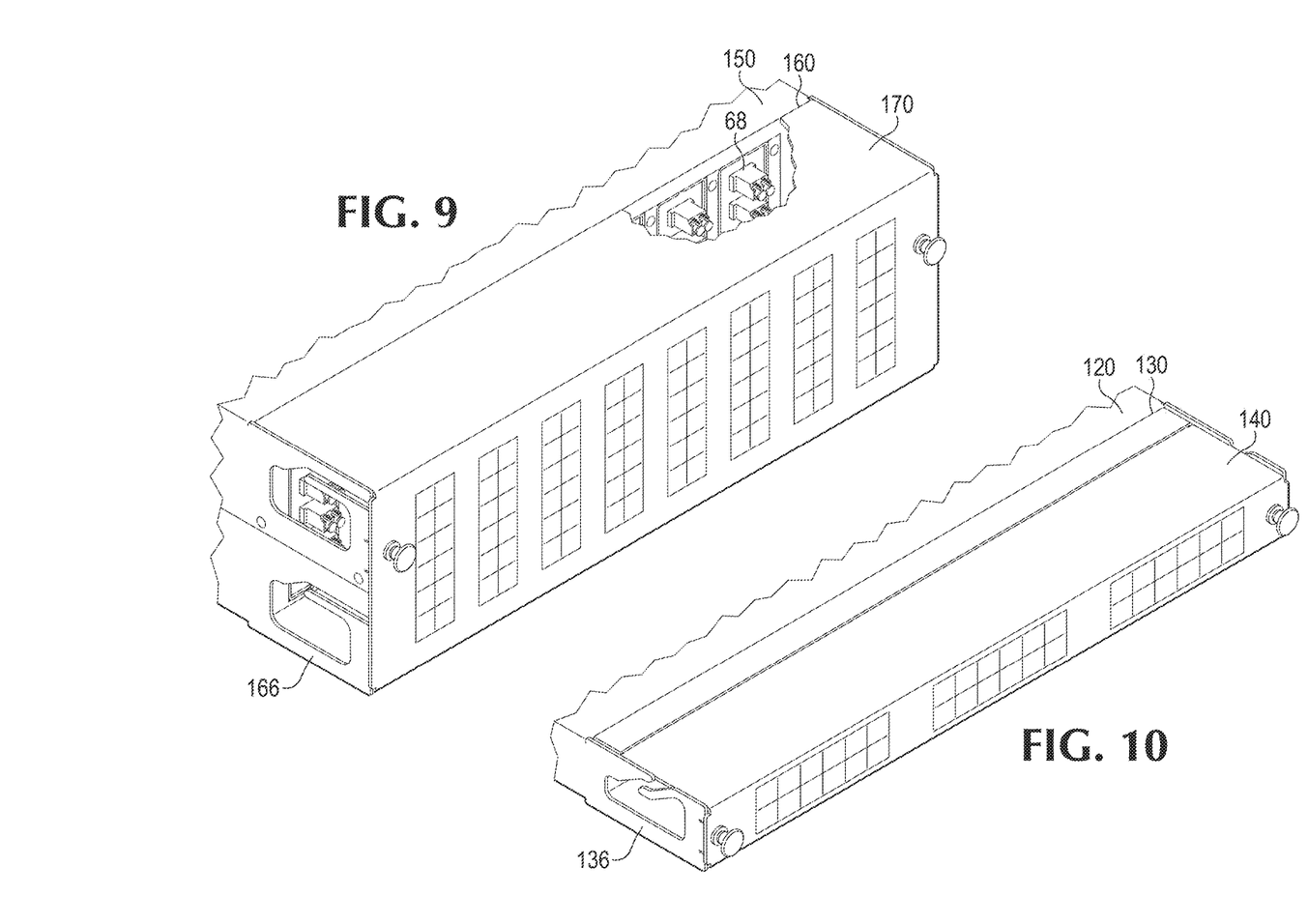
FIGS. 9 and 10 show covers extending over ends of the enclosures shown in FIGS. 7 and 5, respectively.

FIG. 9 shows another view of enclosure 150 with cover 170 attached over end 160 and monitoring ports 68. FIG. 10 shows another view of enclosure 120 with cover 140 attached over end 130 and monitoring ports 68. Covers 140 and 170 may comprise a transparent plastic so that technicians can view the connections between optical fibers and the interconnection ports and monitoring ports.

Optical interfaces 50 in FIGS. 5-10 offer a flexible and expandable installation scheme supporting up to 240 front patching-LC footprint-terminations (or 60 RRUs) and the corresponding monitoring ports. Despite the high maximum capacity, the design and layout of the optical interface and the associated ports provide easy access to interconnection points.

Multiple bracket mounting options allow FO modules 100 to be installed with monitoring ports at the front or the rear end of the 1U or 3U enclosure trays providing interchangeable installation alternatives to support site expandability and topology optimization.

Other advantages of the modular optical interface 50 includes compact design, a fully preconnectorized solution, multiple modular installation options, advanced expandability with easy maintenance and component replacement, high termination density, easy access to ports, easy connector handling, minimum attenuation complying with strict WDM requirements, stable dedicated channel routing for stable optical performance, and integrated cable management and protection for high density applications.

Only those parts of the various units are shown and described which are necessary to convey an understanding of the examples to those skilled in the art. Those parts and elements not shown may be conventional and known in the art. Having described and illustrated the principles of the invention in a preferred embodiment thereof, it should be apparent that the invention may be modified in arrangement and detail without departing from such principles.

We claim all modifications and variation coming within the spirit and scope of the following claims.

The invention claimed is:

1. A fiber optic interface, comprising:
   fiber splitters for splitting signals transmitted between remote radio units (RRUs) and a baseband unit (BBU);
   a first set of interconnection ports for connecting the fiber splitters to remote radio units,
   a second set of interconnection ports for connecting the fiber splitters to the BBU;
   a third set of monitoring ports for connecting the fiber splitters to monitoring equipment;
   optical fibers attached to the interconnection ports, monitoring ports, and fiber splitters; and
   a splitter holder located between at some of the interconnection ports and retaining at least some of the fiber splitters and at least some of the fibers, the splitter holder including substantially flat top and bottom sections with curved end sections extending between the top and bottom sections, wherein at least some of the ports and the holder are in the same axis.

2. The fiber optic interface of claim 1, wherein the splitter holder retains:
   a first set of the fiber splitters configured to split the signals received over the first set of interconnection ports into duplicate uplink signals for outputting on the second set of interconnection ports and the third set of monitoring ports; and
   a second set of the fiber splitters configured to split the signals received over the second set of interconnection ports into duplicate downlink signals for outputting on the first set of interconnection ports and the third set of monitoring ports.

3. The fiber optic interface of claim 1, wherein the splitter holder includes an oval shaped profile with flat top and bottom sections and round ends sections extending between the top and bottom sections.

4. The fiber optic interface of claim 3, including:
   a first set of optical uplink fibers extending from the first set of interconnection ports, over the flat top section of the splitter holder, and to first ends of an upper set of the fiber splitters located on the flat top section of the splitter holder;
   a second set of optical uplink fibers extending from second ends of the upper set of fiber splitters, around one of the round end sections and along the bottom section of the splitter holder, and connecting to one of the second set of interconnection ports; and
   a third set of optical uplink fibers extending from the second ends of the upper set of fiber splitters, along the top section of the splitter holder and connecting to the third set of monitoring ports.

5. The fiber optic interface of claim 4, including:
   a first set of optical downlink fibers extending from the second set of interconnection ports, along the bottom section of the splitter holder, and to first ends of a lower set of the fiber splitters located on the bottom section of the splitter holder;
   a second set of optical downlink fibers extending from second ends of the lower set of fiber splitters, around one of the round ends sections and along the top section of the splitter holder, and connecting to one of the first set of interconnection ports; and a third set of optical uplink fibers extending from the second ends of the lower set of fiber splitters, along the bottom section of the splitter holder and connecting to the third set of monitoring ports.

6. The fiber optic interface of claim 1, including walls extending out from an outside perimeter of the splitter holder forming channels, each channel retaining:
   a first set of uplink optical fibers connected to a first one of the first set of interconnection ports, a first one of the second set of interconnection ports, and a first one of the third set of monitoring ports;
   a first one of the fiber splitters coupled to the first set of uplink optical fibers for splitting uplink signals received from an associated one of the RRUs;
   a second set of downlink optical fibers connected to a second one of the first set of interconnection ports, a second one of the second set of interconnection ports, and a second one of the third set of monitoring ports; and
   a second one of the fiber splitters coupled to the second set of downlink optical fibers for splitting downlink signals received from the BBU.

7. The fiber optic interface of claim 6, including caps attaching across top ends of the walls for retaining the first set of uplink optical fibers and retaining the second set of downlink optical fibers in the channels.

8. The fiber optic interface of claim 1, including an enclosure having a first end and a second opposite end, wherein the first and second set of interconnection ports extend out of the first end of the enclosure and the third set of monitoring ports extend out of the second end of the enclosure.

9. The fiber optic interface of claim 1, wherein the fiber splitters are configured to split the signals received from the RRUs and the BBU into duplicate signals.

10. The fiber optic interface of claim 9, wherein:
    the first and the third set of interconnection ports receive the duplicate signals from the BBU; and
    the second and third interconnection ports receive the duplicate signals from the RRUs.

11. An optical fiber device, comprising:
    a first set of interconnection ports configured to connect to remote radio units (RRUs);
    a second set of interconnection ports configured to connect to a baseband unit (BBU);
    fiber splitters configured to split optical signals received on the first set of interconnection ports from the RRUs into duplicate optical signals and split optical signals received on the second set of interconnection ports from the BBU into duplicate optical signals; and
    a third set of one or more interconnection ports configured to connect to one of the duplicate optical signals split from the first set of interconnection ports and one of the duplicate optical signals split from the second set of interconnection ports.

12. The optical fiber device of claim 10, wherein:
    the first set of interconnection ports include both uplink ports for connecting to optical fibers carrying uplink signals received from the RRUs and downlink ports for connecting to optical fibers carrying downlink signals transmitted to the RRUs;
    the second set of interconnection ports include both uplink ports for connecting to optical fibers carrying the uplink signals to the BBU and downlink ports for connecting to the optical fibers carrying the downlink signals received from the BBU; and the third set of interconnection ports include both uplink ports for connecting to optical fibers carrying one of the duplicate optical signals received from the RRUs and downlink ports for connecting to optical fibers carrying one of the duplicate optical signals received from the BBU.

13. The optical fiber device of claim 11, wherein the fiber splitters and interconnection ports are contained in an optical fiber module.

14. The optical fiber device of claim 13, wherein the first and second set of interconnection ports extend from a first end of the optical fiber module and the third set of interconnection ports extend from a second opposite end of the optical fiber module.

15. The optical fiber device of claim 13, including:
a rack enclosure including:
top and bottom walls,
side walls extending between sides of the top and bottom walls, and
dividers extending between the side walls forming slots, wherein the optical fiber module is configured to insert into one of the slots formed in the enclosure.

16. The optical fiber device of claim 15, wherein the enclosure is a U1 or U3 enclosure.

17. The optical fiber device of claim 15, wherein the optical fiber module is configured to insert into one of the slots either through a front end or a back end of the enclosure.

18. The fiber optic device of claim 11, including a splitter holder includes an oval shaped profile with flat top and bottom sections and round ends sections extending between the top and bottom sections.

19. The fiber optic device of claim 18, including:
a first set of optical uplink fibers extending from the first set of interconnection ports, over the flat top section of the splitter holder, and to first ends of an upper set of the fiber splitters located on the flat top section of the splitter holder;
a second set of optical uplink fibers extending from second ends of the upper set of fiber splitters, around one of the round end sections and along the bottom section of the splitter holder, and connecting to one of the second set of interconnection ports; and
a third set of optical uplink fibers extending from the second ends of the upper set of fiber splitters, along the top section of the splitter holder and connecting to the third set of monitoring ports.

20. The fiber optic device of claim 19, including:
a first set of optical downlink fibers extending from the second set of interconnection ports, along the bottom section of the splitter holder, and to first ends of a lower set of the fiber splitters located on the bottom section of the splitter holder;
a second set of optical downlink fibers extending from second ends of the lower set of fiber splitters, around one of the round end sections and along the top section of the splitter holder, and connecting to one of the first set of interconnection ports; and
a third set of optical uplink fibers extending from the second ends of the lower set of fiber splitters, along the bottom section of the splitter holder and connecting to the third set of monitoring ports.

* * * * *